United States Patent
Smith et al.

(10) Patent No.: US 7,628,458 B2
(45) Date of Patent: Dec. 8, 2009

(54) ADAPTIVE BRAKE FLOW MASKING AT REMOTE LOCOMOTIVES OF A DISTRIBUTED POWER TRAIN

(75) Inventors: Eugene A. Smith, Satellite Beach, FL (US); Robert C. Palanti, West Melbourne, FL (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 11/400,926

(22) Filed: Apr. 10, 2006

(65) Prior Publication Data

US 2007/0236078 A1 Oct. 11, 2007

(51) Int. Cl.
*B60T 13/74* (2006.01)
*B60T 13/66* (2006.01)
*B60T 15/00* (2006.01)

(52) U.S. Cl. .............. 303/3; 303/7; 303/128; 303/132; 303/67; 303/77; 303/15

(58) Field of Classification Search .............. 303/66, 303/67, 75, 77, 78, 3, 15, 16, 20, 7, 8, 9, 303/128, 132, 134, 135
See application file for complete search history.

(56) References Cited

U.S. PATENT DOCUMENTS

| 3,539,226 | A |   | 11/1970 | Barber |  |
|---|---|---|---|---|---|
| 3,659,903 | A | * | 5/1972 | Sarbach | 303/20 |
| 4,687,258 | A |   | 8/1987 | Astley |  |
| 5,039,038 | A |   | 8/1991 | Nichols et al. |  |
| 5,735,579 | A | * | 4/1998 | Wood et al. | 303/7 |
| 5,963,883 | A |   | 10/1999 | Cunkelman et al. |  |
| 5,966,674 | A |   | 10/1999 | Crawford et al. |  |
| 6,095,618 | A |   | 8/2000 | Heneka et al. |  |
| 6,314,345 | B1 |   | 11/2001 | Coombes |  |
| 6,375,275 | B1 | * | 4/2002 | Smith et al. | 303/3 |
| 6,375,276 | B1 |   | 4/2002 | Delaruelle |  |
| 6,443,538 | B1 | * | 9/2002 | Smith et al. | 303/7 |
| 6,824,226 | B2 |   | 11/2004 | Smith, Jr. et al. |  |
| 6,866,347 | B2 |   | 3/2005 | Smith et al. |  |
| 2002/0089232 | A1 |   | 7/2002 | Smith, Jr. et al. |  |
| 2003/0137191 | A1 |   | 7/2003 | Smith, Jr. et al. |  |
| 2005/0189815 | A1 |   | 9/2005 | Bryant |  |

* cited by examiner

*Primary Examiner*—Thomas J Williams
(74) *Attorney, Agent, or Firm*—Robert Wawrzyn, Esq.; Terry M. Sanks, Esq.; Beusse Wolter Sanks Mora & Maire, P.A.

(57) ABSTRACT

In a transportation system comprising a fluid carrying brake pipe (14) connecting controlling member of the system and a controlled member (e.g., 12) a method of adaptively disabling an ability of the controlled member to respond to an unexpected brake pipe flow condition includes determining a braking state of the transportation system. The method also includes determining a degree of change in a brake pipe pressure during the braking state. The method further includes disabling an ability of the controlled member to respond to an unexpected brake pipe flow condition for a time period responsive to the braking state and the degree of change in the brake pipe pressure so that an undesired operation of the controlled member is limited.

16 Claims, 1 Drawing Sheet

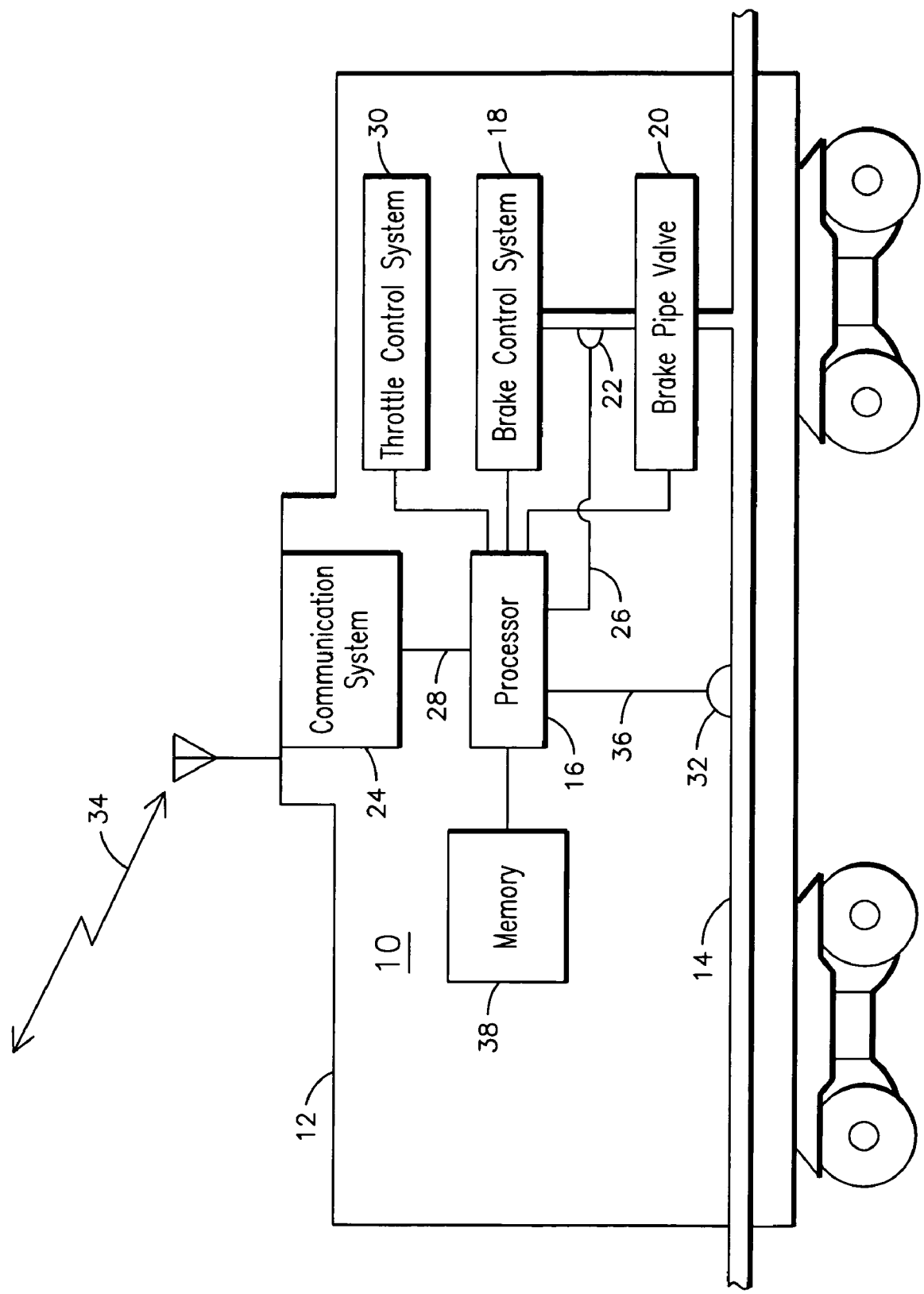

ADAPTIVE BRAKE FLOW MASKING AT REMOTE LOCOMOTIVES OF A DISTRIBUTED POWER TRAIN

FIELD OF THE INVENTION

This invention relates generally to the field of locomotive control, and more particularly to adaptively masking a brake pipe flow condition at a remote locomotive of a distributed power train.

BACKGROUND OF THE INVENTION

Distributed power train operation supplies motive power from a lead locomotive and one or more remote locomotives spaced apart from the lead locomotive in a train consist. Each lead and remote locomotive includes an air brake control system for controlling braking operations and a communication system for exchanging information between lead and remote locomotives over a communication link. A brake pipe fluidically interconnects each of the locomotives and rail cars of the train wherein modulation of a fluid flow, such as a fluid pressure in the brake pipe, is conventionally used to indicate desired braking operations. Remote locomotive braking operations may be controlled responsive to sensed brake pipe flow conditions at the respective remote locomotives.

Brake application is typically accomplished by venting, or reducing a pressure in the brake pipe. However, brake pipe venting at only the lead locomotive of a train requires propagation of the corresponding brake pipe pressure reduction along the length of the train, thus slowing brake application at rail cars and remote locomotives near the end of the train. In distributed power trains, braking is more effectively accomplished by venting a brake pipe at both the lead and remote locomotives of the train, thus accelerating the brake pipe venting and the application of brakes, throughout the train. Accordingly, the lead locomotive may separately command braking operations of the remote locomotives over the communication link to achieve more effective braking of the train.

In addition to controlling braking according to brake pipe flow conditions, each remote locomotive may be capable of independently controlling a fluid flow in the brake pipe responsive to a sensed brake pipe flow condition. For example, each remote locomotive may be capable of charging the brake pipe responsive to a sensed brake pipe fluid leak. During certain disturbed power train operations, it is desired to limit a remote locomotive's ability to control brake pipe fluid flow. For example, during brake pipe charging after a train brake application and corresponding brake release, a brake pipe flow indication at the remote locomotive may be ignored, or masked, to prevent the remote locomotive from interfering with brake pipe charging.

BRIEF DESCRIPTION OF THE DRAWINGS

The sole FIGURE is a schematic diagram of an exemplary system for adaptively masking a brake pipe flow condition at a remote locomotive of a distributed power train.

DETAILED DESCRIPTION OF THE INVENTION

The present inventors have observed in distributed power train operations that a time period required for a brake pipe pressure to drop and stabilize during a brake application is dependent on a degree of brake application being commanded and a length of the train. For example, when making a full service brake application from a released state, the time required for the brake pipe pressure to drop from an initial pressure and stabilize at a lower, full service brake pressure has been observed to be greater than a time required for a smaller brake application, such as a minimum service application. However, conventional brake pipe flow masking schemes typically mask brake pipe flow at the remote locomotive for a set time period, such as 90 seconds, regardless of a degree of braking application performed. The inventors have observed that this fixed time period may be too short in some cases, such as full service applications, resulting in unexpected flow conditions being sensed at a remote locomotive that may cause the remote locomotive to respond inappropriately, especially at remote locomotives positioned near an end of longer trains. Conversely, the fixed time period may be overly long in some cases, such as after a minimum service brake application, wherein brake pipe flow is masked long after the brake pipe flow has stabilized, thereby preventing flow responsive braking of the remote locomotive. Accordingly, the inventors have developed an innovative scheme for adaptively masking a brake pipe flow condition at a remote locomotive of a distributed power train so that an undesired operation of the remote locomotive may be avoided.

The sole FIGURE is a schematic diagram of an exemplary system 10 for adaptively masking a brake pipe flow condition at a remote locomotive 12 of a distributed power railway train. Advantageously, the system 10 disables an ability of the remote locomotive 12 to respond to an unexpected brake pipe flow condition for a time period responsive to a braking state of the train and a sensed degree of change in the brake pipe pressure. Accordingly, an undesired operation of the remote locomotive 12, for example, in response to an unexpected brake pipe flow condition, may be advantageously limited.

The system 10 may include a brake control system 18 in fluid communication with a brake pipe 14 via a brake pipe valve 20, wherein the brake control system 18 controls the brake pipe fluid flow at the remote locomotive 12. The brake pipe valve 20 is operable to disable the remote locomotive 12 from controlling a brake pipe flow, such as be interrupting a fluid communication between the brake control system 18 and the brake pipe 14. Accordingly, the brake pipe valve 20 may be operable to prevent or allow charging and venting of the brake pipe at the remote locomotive 12. The system 10 may also include a communication system 24, such as a wireless communication system, for receiving commands issued by a lead locomotive via communication link 34.

In an aspect of the invention, the system 10 includes a processor 16 receiving a fluid flow signal 26 from a fluid flow sensor 22 and/or receiving a fluid pressure signal 36 from a fluid pressure sensor 32. The fluid flow sensor 22 monitors a condition of the brake pipe fluid flow, such as fluid flow into the brake pipe 14 at the remote locomotive 12, and generates a fluid flow signal 26 responsive to a sensed fluid flow condition. The fluid pressure sensor 32 may monitor a condition of brake pipe fluid pressure, such as fluid pressure in the brake pipe 14 at the remote locomotive 12, and generates the fluid pressure signal 36 responsive to a sensed fluid pressure condition. Processor 16 may take any form known in the art, for example an analog or digital microprocessor or computer, and it may be integrated into or combined with one or more controllers used for other functions related to the operation of the remote locomotive 12.

The processor 16 may be configured to directly or indirectly control an operation of a throttle control system 30, for example, responsive to the fluid flow signal 26 or fluid pressure signal 36. The processor 16 may also receive a communication operability status signal 28 from the communication system 24 indicating whether or not the wireless link is operable for communicating with the lead locomotive for receiving traction and or braking commands. The processor 16 may control the throttle control system 30 and/or brake pipe valve 20 responsive to the status signal 28.

In an embodiment of the invention, the processor 16 may be configured for disabling an ability of the remote locomotive 12 to respond to an unexpected brake pipe flow condition for a variable time period responsive to the fluid pressure signal 36, such as by ignoring, or masking, the fluid flow signal 26. For example, the processor 16 may be configured to implement steps for adaptively masking a brake pipe flow condition during a change in a braking condition of the train to limit the remote's ability to respond to brake pipe flow conditions, such as unexpected brake pipe flow conditions, during the masking period. The steps necessary for such processes may be embodied in hardware, software and/or firmware in any form that is accessible and executable by processor 16 and may be stored on any medium that is convenient for the particular application, such a memory 38.

In an embodiment, the processor 16 may be configured for determining a braking state of the train, such as a brake application state or a brake release state. For example, the processor 16 may determine a braking state based on a last received braking command for the lead locomotive. The processor 16 may also be configured for determining a degree of change in a brake pipe pressure during the braking identified state, such as a drop in pressure indicative of brake application, or a rise in pressure indicative of brake release. The processor 16 may then be configured to adaptively disable an ability of the remote locomotive to respond to an unexpected brake pipe flow condition for a time period responsive to the identified braking state and the sensed degree of change in the brake pipe pressure, so that an undesired operation of the remote locomotive is limited during the masking period. In an example embodiment, the processor 16 may be configured for disabling the remote locomotive 12 for a shorter time period for a relatively smaller change in the brake pipe pressure, and disabling the remote locomotive 12 for a longer time period for a relatively greater change in the brake pipe pressure. Disablement, or masking, time periods may be configured based on whether the train braking state is a brake application state or a brake release state.

In another example embodiment, two different time duration periods may be used depending on a degree of sensed pressure change in the brake pipe. For example, when the train is in a brake release state, a masking time period duration may be set to about 90 seconds for a brake application indication corresponding to a drop in sensed brake pipe pressure of less than about 21 pounds per square inch (psi). For a brake application indication corresponding to a drop in sensed brake pipe pressure of greater than or equal to about 21 psi, a masking time period duration may be set to about 105 seconds. When the train is in a brake application state, a masking time period duration may be set to about 90 seconds for a brake application indication corresponding to a drop in sensed brake pipe pressure of less than about 14 pounds per square inch psi. For a brake application indication corresponding to a drop in sensed brake pipe pressure of greater than or equal to about 14 psi, a masking time period duration may be set to about 105 seconds.

In yet another embodiment, two or more different time duration periods may be used, depending on a degree of sensed pressure change in the brake pipe. For example, when the train is in a brake release state, a masking time period duration may be set to about 60 seconds for a brake application indication of less than about 10 psi, to about 90 seconds for a brake application indication between about 10 psi to about 21 psi, and to about 105 seconds for a brake application indication grater than about 21 psi. When the train is in a brake application state, a masking time period duration may be set to about 60 seconds for a brake application indication of less than about 3 psi, to about 90 seconds for a brake application indication between about 3 psi to about 14 psi, and to about 105 seconds for a brake application indication greater then about 14 psi. In a similar manner, different masking time durations may also be applied to brake release operations, for example, from a brake application state according to sensed levels of changes in brake pipe pressure.

In another exemplary embodiment of the invention, the system 10 may include memory 38 storing a masking schedule comprising a plurality of masking duration time periods, each time period corresponding to a respective range of change in a brake pipe fluid pressure. The processor 16 may include logic executable for accessing the masking schedule stored in the memory 38 for disabling an ability of the remote locomotive 12 to respond to an unexpected brake pipe flow condition for a masking duration time period corresponding to sensed degree of change in the brake pipe fluid pressure. In an aspect of the invention, the masking schedule may embody the masking time durations corresponding the brake application levels described previously.

Based on the foregoing specification, the invention may be implemented using computer programming or engineering techniques including computer software, firmware, hardware or any combination or subset thereof, wherein the technical effect is to adaptively mask a brake pipe flow condition at a remote locomotive of a distributed power train. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. For example, the method and system described herein may be applied to any transportation system comprising members interconnected by a fluidic brake pipe such as a train, a semi-truck with trailers, etc. Accordingly, it is intended that the invention be limited only by the spirit and scope of the appended claims.

We claim:

1. In a railroad train comprising a fluid carrying brake pipe connecting a lead locomotive and at least one remote locomotive, a method of adaptively disabling an ability of the remote locomotive to respond to an unexpected brake pipe flow condition comprising:
   determining a braking state of the train;
   determining a degree of change in a brake pipe pressure proximate the remote locomotive during the braking state; and
   disabling an ability of the remote locomotive to respond to an unexpected brake pipe flow condition for a time period responsive to the braking state and the degree of change in the brake pipe pressure so that an undesired operation of the remote locomotive is limited;
   wherein a duration of the time period is based on the degree of change in the brake pipe pressure when the braking state of the train is a release state and/or the degree of chance in the brake pipe pressure when the braking state of the train is an application state.

2. The method of claim 1, wherein disabling an ability of the remote locomotive to respond comprises masking a brake pipe fluid flow indication at the remote locomotive.

3. The method of claim 1, wherein the degree of change in the brake pipe pressure is indicative of a brake application.

4. The method of claim 1, wherein the degree of change in the brake pipe pressure is indicative of a brake release.

5. The method of claim 1, wherein the time period comprises a shorter duration for a relatively smaller change in the brake pipe pressure and a longer duration for a relatively greater change in the brake pipe pressure.

6. The method of claim 1, wherein a duration of the time period is determined according to a masking schedule having a plurality of masking duration steps, each step corresponding to a respective predetermined degree of change in the brake pipe pressure.

7. In a railroad train comprising a fluid carrying brake pipe connecting a lead locomotive and at least one remote locomotive, a system for disabling an ability of the remote locomotive to respond to an unexpected brake pipe flow condition comprising:
   a brake pipe pressure sensor for sensing a fluid pressure in the brake pipe proximate the first remote locomotive and for providing a pressure signal representative of a sensed fluid pressure; and
   a processor configured for determining a braking state of the train; for determining a degree of change in a brake pipe pressure during the braking state responsive to the pressure signal; and for disabling an ability of the remote locomotive to respond to an unexpected brake pipe flow condition for a time period responsive to the braking state and the degree of change in the brake pipe pressure so that an undesired operation of the remote locomotive is limited;
   wherein a duration of the time period is based on the degree of change in the brake pipe pressure when the braking state of the train is a release state and/or the degree of chance in the brake pipe pressure when the braking state of the train is an application state.

8. The system of claim 7, wherein disabling an ability of the remote locomotive to respond comprises masking a brake pipe fluid flow indication at the remote locomotive.

9. The system of claim 7, wherein the degree of change in the brake pipe pressure is indicative of a brake application.

10. The system of claim 7, wherein the degree of change in the brake pipe pressure is indicative of a brake release.

11. The system of claim 7, wherein the time period comprises a shorter duration for a relatively smaller change in the brake pipe pressure and a longer duration for a relatively greater change in the brake pipe pressure.

12. The system of claim 7, wherein a duration of the time period is determined according to a masking schedule having a plurality of masking duration steps, each step corresponding to a respective predetermined degree of change in a brake pipe pressure.

13. In a railroad train comprising a fluid carrying brake pipe connecting a lead locomotive and at least one remote locomotive a system for disabling an ability of the remote locomotive to respond to an unexpected brake pipe flow condition comprising:
   a brake pipe pressure sensor for sensing a fluid pressure in the brake pipe proximate the remote locomotive and for providing a pressure signal representative of a sensed fluid pressure;
   a memory storing a masking schedule comprising a plurality of masking duration time periods, each time period based on a respective range of change in a brake pipe fluid pressure; and
   a processor comprising logic executable for accessing the masking schedule stored in the memory responsive to the pressure signal to disable an ability of the remote locomotive to respond to an unexpected brake pipe flow condition for a masking duration time period corresponding to sensed degree of change in the brake pipe fluid pressure so that an undesired operation of the remote locomotive is limited.

14. The system of claim 13, wherein each masking duration time period of the masking schedule is further based on a braking state of the train.

15. The system of claim 14, wherein the processor further comprises logic executable for accessing the masking schedule responsive to a braking state of the train.

16. In a transportation system comprising a fluid carrying brake pipe connecting a controlling member of the system and a controlled member of the system, a method of adaptively disabling an ability of a controlled member to respond to an unexpected brake pipe flow condition comprising:
   determining a braking state of the transportation system;
   determining a degree of change in a brake pipe pressure proximate the controlled member during the braking state; and
   disabling an ability of the controlled member to respond to an unexpected brake pipe flow condition for a time period responsive to the braking state and the degree of change in the brake pipe pressure so that an undesired operation of the controlled member is limited;
   wherein a duration of the time period is based on the degree of change in the brake pipe pressure when the braking state of the train is a release state and/or the degree of change in the brake pipe pressure when the braking state of the train is an application state.

* * * * *